(12) United States Patent
Wagenblatt et al.

(10) Patent No.: US 8,332,405 B2
(45) Date of Patent: Dec. 11, 2012

(54) MARKETING PROJECT FILTER SEARCH TOOLS

(75) Inventors: Timo Wagenblatt, Bornheim (DE); Sandra Bicker, Heidelberg (DE); Susann Stieler, Leimen (DE); Martin Schrepp, Hockenheim (DE); Andreas Paffenholz, Troisdorf (DE)

(73) Assignee: SAP AG, Walldorf (DE)

( * ) Notice: Subject to any disclaimer, the term of this patent is extended or adjusted under 35 U.S.C. 154(b) by 500 days.

(21) Appl. No.: 12/569,157

(22) Filed: Sep. 29, 2009

(65) Prior Publication Data

US 2011/0078171 A1  Mar. 31, 2011

(51) Int. Cl.
*G06F 7/00* (2006.01)
*G06F 17/30* (2006.01)
*G06Q 10/00* (2012.01)
*G06Q 30/00* (2012.01)

(52) U.S. Cl. ................ 707/736; 707/769; 705/7.29

(58) Field of Classification Search .......... 707/736, 707/769; 705/7.29
See application file for complete search history.

(56) References Cited

U.S. PATENT DOCUMENTS

| | | | | |
|---|---|---|---|---|
| 6,055,515 A | * | 4/2000 | Consentino et al. | 705/27.1 |
| 6,415,298 B1 | * | 7/2002 | Oesterer et al. | 1/1 |
| 7,353,183 B1 | * | 4/2008 | Musso | 705/7.21 |
| 2001/0044781 A1 | * | 11/2001 | Shutes | 705/59 |
| 2003/0106039 A1 | * | 6/2003 | Rosnow et al. | 717/100 |
| 2008/0077530 A1 | * | 3/2008 | Banas et al. | 705/50 |
| 2009/0299856 A1 | * | 12/2009 | Caunter | 705/14.64 |

* cited by examiner

*Primary Examiner* — Rehana Perveen
*Assistant Examiner* — Huen Wong
(74) *Attorney, Agent, or Firm* — Kenyon & Kenyon LLP

(57) ABSTRACT

Systems and methods are provided to enable filtered searches of marketing-related data by extracting marketing project information, including marketing activities, promotions, and campaigns information from an existing marketing system database and restructuring the extracted information in a hierarchical series of selectable nodes. In an embodiment, some of the nodes may be grouped into time, accounts, products, agreements, or marketing plan tabs. In an embodiment, once one or more nodes are selected and a search is activated, the results may be presented in a list or Gantt chart. In an embodiment, the Gantt chart may be supplemented with additional information including additional date ranges, key performance indicators (KPIs), and/or trade spends. In an embodiment, this additional information may vary according to a user role and the nodes selected.

13 Claims, 18 Drawing Sheets

Filter Search 200

Cluster and Types 210
- ▼ ☑ Key Timings 211
- ▼ ☑ Media 212
- ▼ ☐ Trade 213
  - ▼ ☐ EDLP
    - ☑ HiLo Promotion 214
  - ▼ ☐ BillBack
    - ☑ Off Invoice 215
    - ☑ Lump Sum 216
  - ▼ ☐ Display Pallets 217

Time 230
Accounts 240
Products 250
Agreements 260
Marketing Plans 270

Additional Search Criteria 220

Calendar Year ▼ 235
- ▼ ☑ 2008
  - ☑ Q1
  - ☑ Q2
  - ☑ Q3
  - ☑ Q4
- ▼ ☐ 2007
  - ☑ Q1
  - ☑ Q2
  - ☐ Q3
  - ☐ Q4

Search | Search in Split Calendar | Clear

Save Search As

FIG. 4

Filter Search 200

Cluster and Types 210
- ☑ Key Timings 211
- ☑ Media 212
- ▶ ☐ Trade 213
  - ☐ EDLP
  - ☑ HiLo Promotion 214
  - ☑ BillBack 215
  - ☑ Off Invoice 216
  - ☑ Lump Sum 217
- ▶ ☐ Display Pallets

Time 230
Accounts 240
Products 250
Agreements 260
Marketing Plans 270

Additional Search Criteria 220
- ▶ ☐ Sweets and Snacks 451
  - ☐ Snacks 452
  - ☐ Cookies
- ▶ ☐ Organic Products 453
  - ☑ Organic Snacks 454
  - ☑ Organic Cookies 455
  - ☑ Organic Diet
- ▶ ☐ Product Group
  - ☐ CP0
- ▶ ☐ Product Segment
  - ☐ Display Pallet / Summer Season Save Search As

[Search] [Search in Split Calendar] [Clear]

FIG. 6

Filter Search 200

Cluster and Types 210
- ▼ ☑ Key Timings 211
- ▲ ☑ Media 212
- ▼ ☐ Trade 213
  - ☐ EDLP
  - ▼ ☑ HiLo Promotion 214
    - ☑ BillBack 215
    - ☑ Off Invoice 216
    - ☑ Lump Sum 217
- ▲ ☐ Display Pallets ☑ Time 230
☑ Accounts 240
☑ Products 250
☑ Agreements 260
Marketing Plans 270

Additional Search Criteria 220
- ▼ ☐ Audi Q7 Marketing Plan 671
  - ▲ ☑ Asia Audi Q7 672
  - ▲ ☐ Australia Audi Q7 673
  - ▲ ☐ Europe Audi 674
  - ☑ Italy Audi 675
  - ▶ ☐ Germany Audi 676
  - ☑ Audi Q7 Product Launch 677
  - ☐ Audi Q7 Dealer Enablement 678

Save Search As

[Search] [Search in Split Calendar] [Clear]

MARKETING PROJECT FILTER SEARCH TOOLS

BACKGROUND

Many large businesses rely on enterprise resource planning computing architectures and systems to electronically manage and coordinate business resources, information, and functions. In large organizations these computing architectures may be made up of hundreds of systems, distributed across various entities making up the organization. For example, a global business may rely on location-specific logistics systems to process orders in different localities, division specific supply chain management systems to manage supply chains across geographies, and business specific accounting systems to manage financial transactions at a business level.

Some organizations may also use marketing systems to coordinate and manage multiple marketing activities, campaigns, and promotions. Because organizations may have hundreds or even thousands different marketing activities, campaigns, and promotions depending on different events, clientele, dates, and location, such as Mother's Day, Back to School, Superbowl, and FIFA Soccer World Cup, keeping track of these events can be complex. While existing systems include searching features enabling a user to find particular marketing campaign information based on matching data in a marketing database, these systems require a prior knowledge of certain details of a particular marketing campaign in order to retrieve pertinent data through the searching features.

Figure 1:
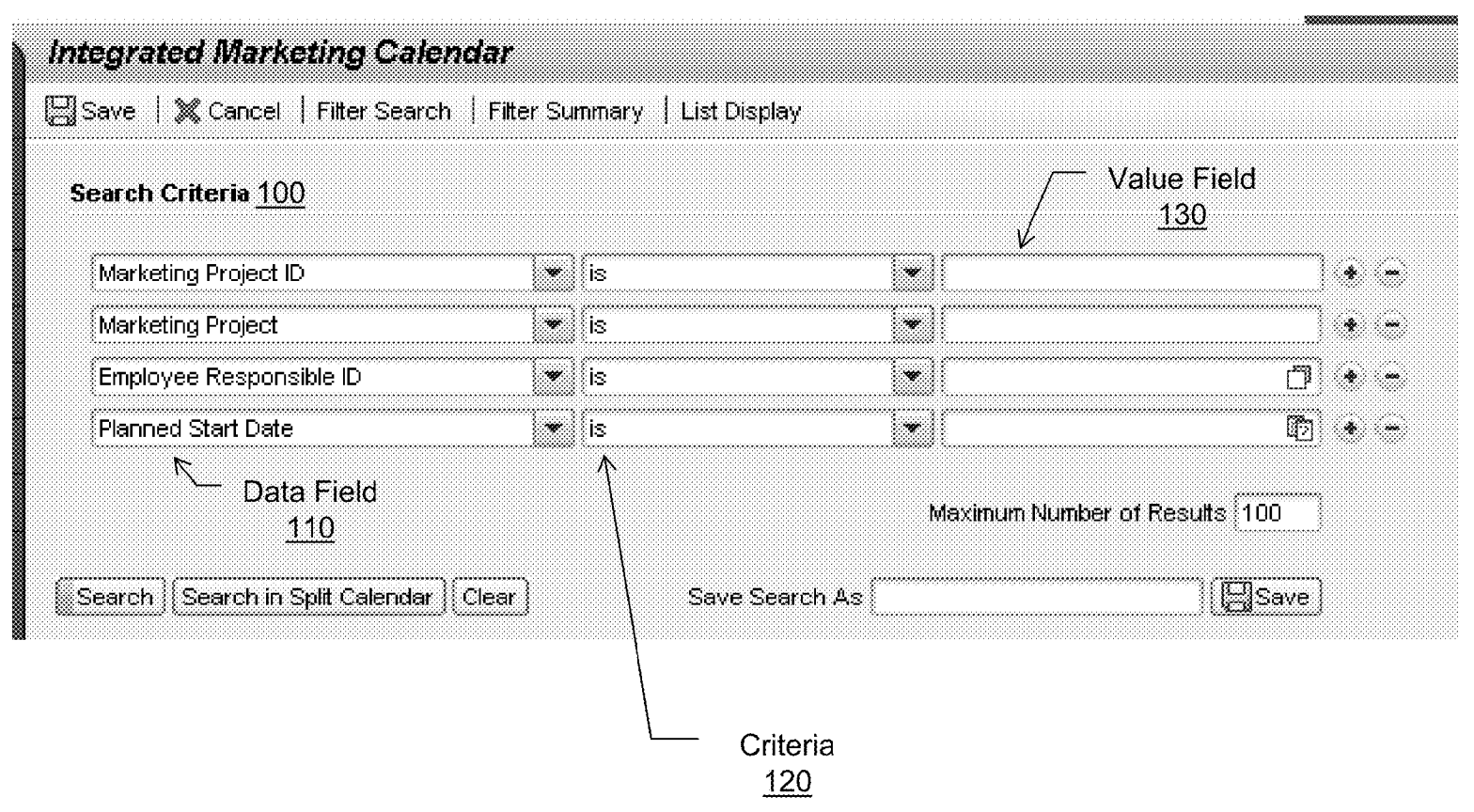

FIG. 1 shows an existing search form for marketing related information. In this existing search form, a user selects one or more data fields 110 to search, such as Marketing Project ID, Marketing Project, Employee Responsible ID, or Planned Start Date. A user then selects a criteria 120 for comparing the selected data field 110 with corresponding data entered by the user in the value field 130. Thus, in order for a user to retrieve data relating to a particular marketing project, a user must enter at least some information identifying the particular marketing project. Moreover, complex searches limited to a subset of products, times, and projects, can be cumbersome, time consuming, and confusing for users to manually enter using the provided data fields 110, criteria 120, and value fields 130.

Once the search has been completed, other issues arise relating to presenting the results to a user. Marketing activities, campaigns, and promotions involve several phases occurring before, during, and after the campaign. For example, before the campaign marketing materials, such as advertisements and coupons may prepared, during the campaign inventory may be re-stocked, and after the campaign retailers may be reimbursed for coupon redemptions. While some users may be interested in reviewing information relating to various phases of a marketing campaign, in some instances this information is unnecessary and distracting, in that it occupies spaces and clutters the screen or output. Furthermore, this additional information also requires additional processing resources leading to longer processing times and slower performance.

There is thus a need for more efficient marketing project search tools to quickly search multiple search fields without a priori knowledge of the exact search parameters and there is a need for more efficient search result presentment tools to enable the quick display of pertinent search result information.

BRIEF DESCRIPTION OF THE DRAWINGS

FIG. 1 shows an existing marketing-related information search form.

FIG. 2 shows an exemplary filter search tool in an embodiment.

FIG. 4 shows an embodiment of the filter search tool with the products tab selected.

FIG. 6 shows an embodiment of the filter search tool with the marketing plan tab selected.

DETAILED DESCRIPTION

Figure 3:
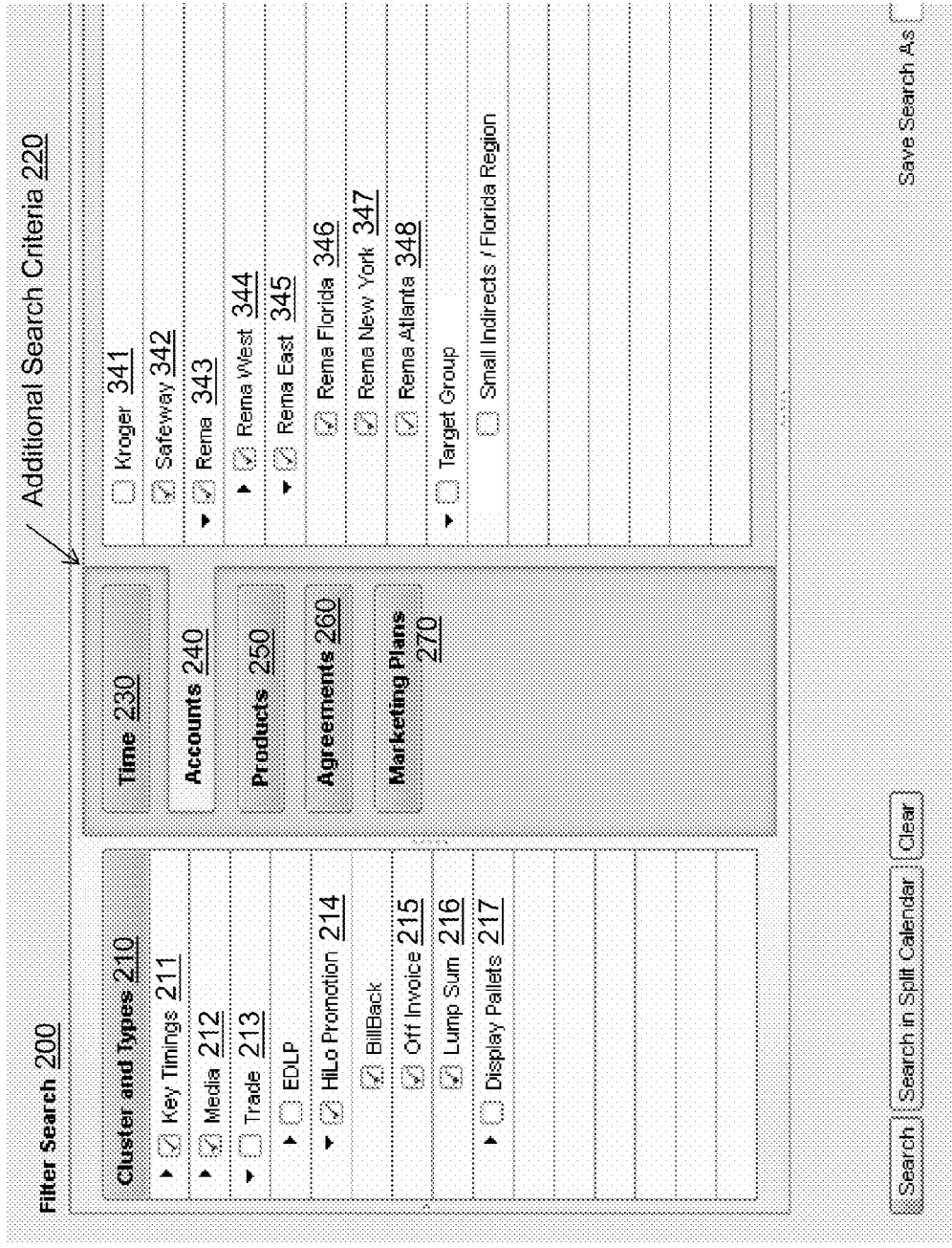
FIG. 3 shows an embodiment of the filter search tool with the accounts tab selected.

An embodiment of the invention includes a filter search tool for selecting one or more desired search attributes, such as time, product, account, plan, or agreement, of one or more specific marketing projects. In an embodiment, the filter search tool may scan an existing marketing system database to import marketing information, such as promotion times, marketed products, marketing accounts, marketing plans, marketing agreements, in order to present a set of selectable search attributes based on the information in the database. In an embodiment, once the desired search attributed have been selected, the search results may be displayed in a list format or a Gantt chart format. In an embodiment, the Gantt chart may show a duration of a marketing project with an option to display additional date ranges, performance indicators, and trade spends relating to the marketing project.

FIG. 2 shows an exemplary filter search 200 tool in an embodiment. In this embodiment, the filter search area 200 is subdivided into two different areas, a cluster area 210 and an additional search criteria area 220. The cluster area 210 may contain many selectable nodes, each node may correspond to one or more marketing activity, promotion, or campaign. In an embodiment, when the filter search tool 200 is added to an existing system, the filter search tool 200 automatically searches an existing marketing database on an existing marketing system to identify each marketing activity, promotion, or campaign in the database. An identifier for each marketing activity, promotion, or campaign in the database is then added to the cluster area 210, where a user can select or deselect one or more activities, promotions, and campaigns to search through. By scanning an existing database and adding these selectable identifiers, a user can easily see all of the marketing projects in the organization, whether they are activities, promotions, or campaigns. Providing a visual interface containing a list of the selectable identifiers may also assist users in remembering specific marketing projects that they may have otherwise forgotten about.

In an embodiment, after the marketing project identifiers have been extracted from an existing marketing system, the extracted identifiers may be organized into a tree containing various nodes and sub-nodes. In an embodiment, the cluster area 210 may be configured with three primary nodes, key timings 211, media 212, and trade 213. Each of these primary nodes may have one or more sub-nodes, while each of these sub-nodes may have one or more further sub-nodes, and so on. The key timings node 211 may be used as a primary node for internal marketing projects having an impact on the organization, such as new product launches and packaging changes. The media node 212 may be used as a primary node for advertising projects, including advertising activities, promotions, and campaigns. The media node 212 may organize these advertising projects in sub-nodes according to the type of media used, such as print, on-line, television, or others. The trade node 213 may be used as a primary node for various trade promotions and promotional campaigns, such as rebates, coupons, volume or bundling discounts, store displays, or free samples. The trade node 213, like the other nodes 211 and 212, may be sub-divided based on different categories of activities, promotions, and campaigns. For example, the various hi-lo promotions that an organization may have used, such as off invoicing promotions 215 or lump sum promotions 216 may be subsets of the hi-lo promotions sub-node 214 of the trade node 213. Other promotions, such as display pallet promotions may be categorized under other sub-nodes such as display pallet sub-node 217. In an embodiment, the three primary nodes, key timings 211, media 212, and trade 213, are mutually exclusive so that each specific marketing activity, promotion, or campaign is listed under only one of these three primary nodes.

In an embodiment, each of the marketing project identifiers may be manually mapped by a system administrator or other authorized user to the corresponding primary node or sub-node. An authorized user, such as a system administrator may also create additional or reconfigure existing primary nodes and sub-nodes depending on the structure of the marketing department. In an embodiment, the mappings between the nodes and sub-nodes and marketing project identifiers, including identifiers for specific marketing activities, promotions, and campaigns collectively making up the marketing project, are stored in a database.

In an embodiment, various marketing project identifiers may be automatically mapped to a specific node or sub-node. In an embodiment, the automatic mapping may occur by comparing specific fields or entries linked or associated with the project identifier in the marketing database. For example, trade promotions often involve some form of third party remuneration. To determine if a project identifier should be associated with a trade node 213, the system may be configured to check fields in the marketing database for remuneration entries to trade partners or customers to automatically classify the project under the trade node 213. Further details of the remuneration scheme stored in the database could be automatically analyzed to further classify the project according to the type of promotion, such as hi-lo promotion 214, off invoice promotion 215, lump sum promotion 216, display pallet promotion 217, or others.

Automatic mapping for the media node 212 may occur by comparing other fields or entries linked or associated with the project identifier in the marketing database. For example, media promotions often involve certain known entities, such as advertisement agencies, media outlets, and the like. Moreover, certain data relating to the promotion, such as the TV stations, magazines, or media outlets running the advertisements is often stored in at least one component of the marketing system. Information stored in the marketing system about these known entities linked to the project identifier may be used to classify the project under the media node 212 and any further sub-nodes.

In an embodiment, the key timings node 211 is used to classify internal marketing events, such as package changes and new brand launches, which are separate from advertising projects and trade promotions. Thus, in an embodiment, project identifiers that do not map to a media node 212 or trade node 213 may be mapped to the key timing node 211. In an embodiment, project identifiers that contain internal billing or project codes may also be used t classify an identifier under the key timings node 211. In an embodiment, a marketing project, such as a package change may be classified as a sub-node of the key timings node 211. Various activities related to the package change, such as designing new packaging, producing new packaging, and deploying products with new packaging, may be classified as further sub-nodes of the package change node. The classification of these various nodes and sub-nodes may occur in an embodiment by comparing the project codes or other data in the marketing database establishing a link between the marketing projects and individual activities.

Aside from the cluster area 210, a filter search tool 200 may also include an additional search criteria area 220 in an embodiment. In an embodiment, the additional search area 220 may include one or more tabs, which when selected provide a user with additional options for filtering or narrowing a search. In an embodiment, the filter search tool may be preconfigured with a time tab 230, an accounts tab 240, a products tab 250, an agreements tab 260, and a marketing plans tab 270. In an embodiment, the additional search criteria area 220, including the tabs, may vary depending on the nodes selected in the cluster area 210. Additionally, each of the tabs 230 to 270 in the additional search area may be preconfigured to automatically interact with corresponding data in an existing marketing system database. Thus, for example, time related data in the time tab 230, account related data in account tab 240, product related data in the product tab 250, agreement related data in the agreement tab 260, and marketing plan data in the marketing plan tab 270 may all be accessed, searched, and read by the filter search 200.

In an embodiment, once one or more nodes in either the cluster area 210 or the additional search area 220 have been selected, such as key timings node 211, media node 212, and hi-lo promotion node 214, all subordinate nodes to the selected nodes are also automatically selected, such as off invoice and lump sum nodes 215 and 216. The principle may also apply if a node is subsequently deselected; the subordinate nodes would then also be automatically be deselected. Once one or more nodes in the cluster area 210 have been selected, the tabs 230 to 270 in the additional search area 220 review data in the existing marketing database corresponding to selected nodes or marketing projects for tab specific information.

For example, in an embodiment, the filter search tool 200 may review data in the marketing database relating to marketing projects associated with selected nodes 211, 212, and 214. After reviewing this data, a processor may determine that marketing activities, promotions, and campaigns for the selected nodes 211, 212, and 214, only occurred between January 2007 and December 2008. Thus, the only period displayed in the time tab will be January 2007 to December 2008. If the user later changes the nodes selected in the cluster area 210, the dates posted in the time tab 230 of the additional search area 220 may also change depending on the dates of the selected marketing activities, promotions, and campaigns. The time tab 230 may also include a timescale selector 235. The timescale selector 235 allows a user to select a different timescale and/or granularity. For example, the timescale selector 235 in an embodiment may allow a user to select between fiscal years and calendar years. In an embodiment the timescale selector 235 may also allow a user to select different levels of granularity, such as quarters, months, weeks, or days. In an embodiment, the timescale selector 235 may also control the structure and number of timescale nodes, such as including quarterly nodes for each quarter in each year, monthly nodes for each month in each quarterly node, weekly nodes for each week in each monthly node, and so. Different combinations and variations of these timescales and granularities may be present in different embodiments.

FIG. 3 shows an embodiment of the filter search tool 200 with the accounts tab 240 selected. As discussed previously, once a user selects one or more nodes in the cluster area 210, the information displayed in the tabs, such as the accounts tab 240 in the additional search area 220 may also be updated with tab specific information. In the case of the accounts tab 240, the filter search tool 200 may search through data in the existing marketing database of the selected nodes in the cluster area 210 and identify particular accounts associated with one or more marketing activities, promotions, or campaigns corresponding to the selected nodes. Thus, in the embodiment shown in FIG. 3, the filter search 200 may search marketing project data in the marketing database associated with the key timings 211, media 212, and hi-lo promotions node 214, and may find data relating to several accounts such as the Kroger 341, Safeway 342, and Rema 343 accounts. Had the search turned up no accounts, then in an embodiment the accounts tab 240 may be grayed out, removed from the screen, or otherwise differentiated to indicate the lack of selectable accounts. In an embodiment, the filter search 200 may also further limit the accounts shown in the accounts tab 240 that are selectable to those within the time period(s) selected in the time tab 230, as shown, for example in FIG. 2.

In an embodiment, pertinent account information may be nested according to the account structure specified in the marketing database. The account structure may be either be contained in a table containing organization chart information for each account, or the account structure may be specified in the data relating to the specific marketing activity, promotion, or campaign. Thus, the structure for the Rema account 343 shown in FIG. 3, where REMA is subdivided into Rema West 344 and East 345, with Rema East 345 being further subdivided into Rema Florida 346, New York 347, and Atlanta 348, may be contained in a table entry containing organizational information for Rema, or the data may be contained in the data records of the selected nodes in the cluster area 210. Thus, in an embodiment the individual data record may link a particular promotion to Rema New York 347. Rema New York 347 may then be linked to Rema East 345 and Rema 343 either in the data record or in another data structure, such as another table, in the marketing database.

FIG. 4 shows an embodiment of the filter search tool 200 with the products tab 250 selected. As discussed previously, once a user selects one or more nodes in the cluster area 210, the information displayed in the tabs, such as the products tab 250 in the additional search area 220 may also be updated with tab specific information. In the case of the products tab 250, the filter search tool 200 may search through data in the existing marketing database of the selected nodes in the cluster area 210 and identify particular products associated with one or more marketing activities, promotions, or campaigns corresponding to the selected nodes. Thus, in the embodiment shown in FIG. 4, the filter search 200 may search marketing project data in the marketing database associated with the key timings 211, media 212, and hi-lo promotions node 214, and may find data relating to several products such as snacks 452 and organic cookies 454. Had the search turned up no products, then in an embodiment the products tab 250 may be grayed out, removed from the screen, or otherwise differentiated to indicate the lack of selectable products. In an embodiment, the filter search 200 may also further limit the products shown in the products tab 250 that are selectable to those within the time period(s) selected in the time tab 230 and account(s) selected in the accounts tab 240, as shown, for example in FIGS. 2 and 3. In FIG. 4 the visual "check mark" indicators in time tab 230 and the accounts tab 240 may be used in an embodiment to indicate additional limiting criteria applied to the result set shown in the products tab 250, remind the user that the user had selected particular narrowing or filtering criteria in the tab in which the visual indicators appear, or both depending on how the additional search criteria are used in an embodiment.

In an embodiment, some pertinent product information identifying a product associated with a particular marketing activity, promotion, or campaign may be stored in the marketing database. However, additional product information, including the organization and categorization of the organization's products may be retrieved from a product catalog database. In an embodiment, the filter search 200 is preconfigured to retrieve this additional product information from an existing product catalog database in the organization. Thus, for example, the subdivisions of product information shown in FIG. 4, such as sweets and snacks product category 451, divided into subcategories including snacks 452, and organic products 453, with organic product 453 further subdivided into organic snacks 454 and organic cookies 455, may be retrieved from the product catalog database. Thus, once products such as snacks 452, organic snacks 454, and organic cookies 455 have been identified during the initial search of products in the key timings 211, media 212, and hi-lo promotion 214 nodes, the corresponding structural categorization of these products, including the sweets and snacks category 451 and organic products subcategory 453 may be retrieved from the product catalog database and the results organized according to structure and subdivisions of products as reflected in the product catalog database and shown in FIG. 4.

Figure 5:
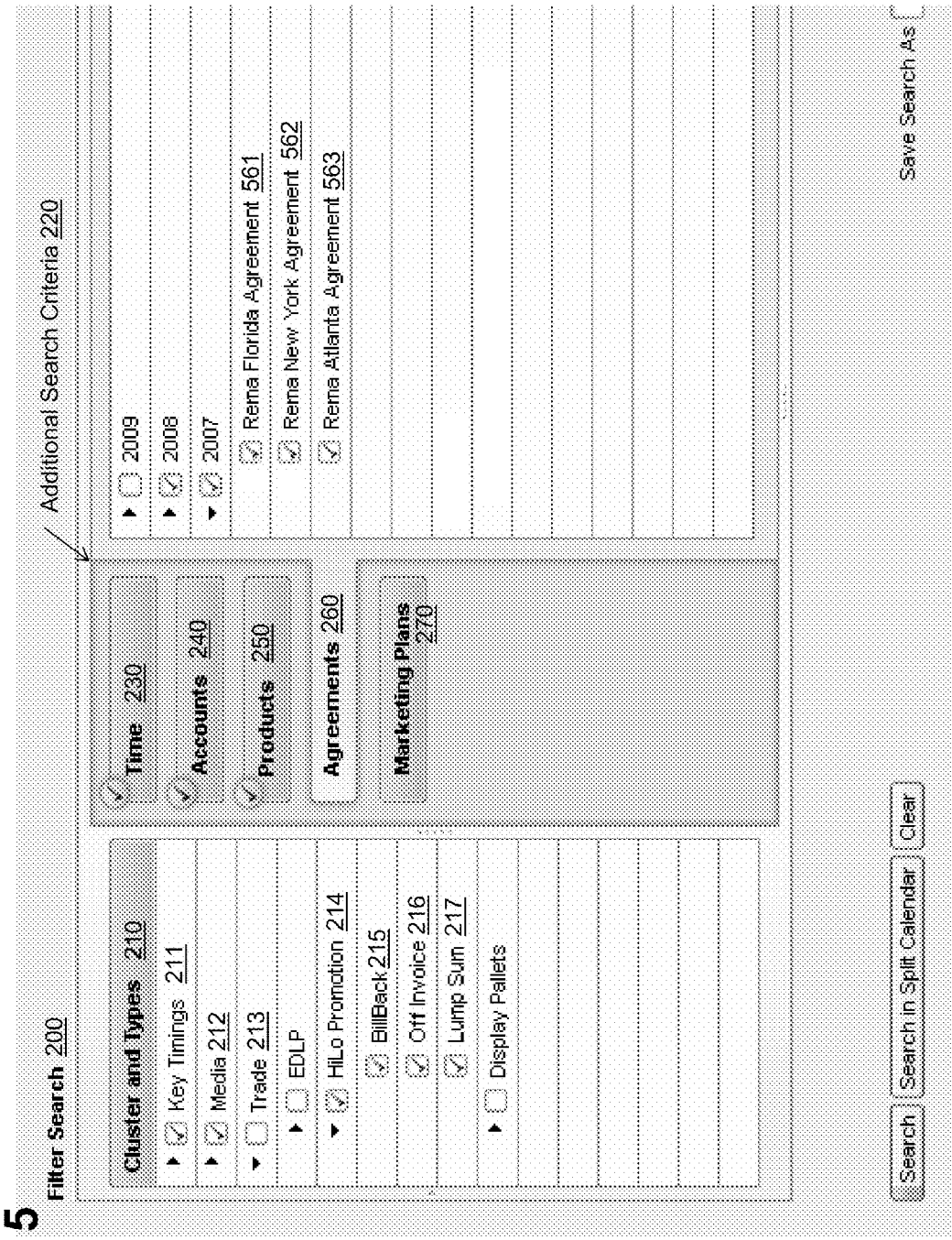
FIG. 5 shows an embodiment of the filter search tool with the agreements tab selected.

FIG. 5 shows an embodiment of the filter search tool 200 with the agreements tab 260 selected. As discussed previously, once a user selects one or more nodes in the cluster area 210, the information displayed in the tabs, such as the agreements tab 260 in the additional search area 220 may also be updated with tab specific information. In the case of the agreements tab 260, the filter search tool 200 may search through data in the existing marketing database of the selected nodes in the cluster area 210 and identify particular agreements associated with one or more marketing activities, promotions, or campaigns corresponding to the selected nodes. Thus, in the embodiment shown in FIG. 5, the filter search 200 may search marketing project data in the marketing database associated with the key timings 211, media 212, and hi-lo promotions node 214, and may find agreements pertaining to the various marketing activities, promotion, and campaigns selected in the cluster area 210. In an embodiment, the identified marketing agreements may be organized by agreement year. Had the search turned up no agreements, then in an embodiment the agreements tab 260 may be grayed out, removed from the screen, or otherwise differentiated to indicate the lack of selectable agreements. In an embodiment, the filter search 200 may also further limit the agreements shown in the products tab 260 to those governing marketing activities within the time period(s) selected in the time tab 230, under the account(s) selected in the accounts tab 240, and covering the product(s) selected in the products tab 250. In FIG. 5 the visual "check mark" indicators in time tab 230, accounts tab 240, and products tab 250 may be used in an embodiment to indicate additional limiting criteria applied to the result set shown in the agreement tab 260, remind the user that the user had selected particular narrowing or filtering criteria in the prior tabs in which the visual indicators appear, or both depending on how the additional search criteria are configured in an embodiment.

In an embodiment, agreements governing particular marketing activities, promotions, and campaigns may be stored in the marketing database, along with other information relating to the agreement, such as the date the agreement was entered or effective and the accounts, products, activities, promotions, and campaigns covered by the agreement. In an embodiment, the filter search 200 is preconfigured to retrieve this agreement information from the existing marketing system database. In an embodiment, the agreements may be organized according to an effective year of the agreement, such as 2008 or 2007. As is the case with cluster area 210 node selection, selecting or deselecting any node in the additional search criteria area 220, which encompasses the tabs 230 to 270, may cause the corresponding subnodes of the selected or deselected node to also be selected or deselected in an embodiment. Thus, selecting the 2007 node in the agreement tab 260 of an embodiment may cause Remi Florida 561, New York 562, and Atlanta 563 agreements to all be selected as well.

FIG. 6 shows an embodiment of the filter search tool 200 with the marketing plan tab 270 selected. As discussed previously, once a user selects one or more nodes in the cluster area 210, the information displayed in the tabs, such as the marketing plan tab 270 in the additional search area 220 may also be updated with tab specific information. In the case of the marketing plan tab 270, the filter search tool 200 may search through data in the existing marketing database of the selected nodes in the cluster area 210 and identify particular marketing plans associated with one or more marketing activities, promotions, or campaigns corresponding to the selected nodes. In an embodiment each marketing plan stored in the marketing database may have a predefined structure. The organization may have marketing plans for each subsidiary, product line, or geographic region. Each of marketing plans may be further subdivided by geographic region, product type, marketing activity, or time period/quarter in different embodiments. Regardless of how the marketing plans of the organization are divided or categorized, existing marketing systems provided categorization tools for marketing plans that enable organizations to subdivide marketing plans into different sections. The existing marketing systems then store the subdivided marketing plans in the marketing system database. In an embodiment, the filter search 200 is preconfigured to interface with the categorization tools provided by these existing marketing systems. In an embodiment, the filter search 200 reads marketing plan data in the existing marketing system database to identify these marketing plan subdivisions stored in the database. The search tools then reconstructs the subdivisions of the marketing plan in the marketing plan tab 270.

FIG. 6 shows an embodiment containing reconstructed marketing plan subdivisions as stored in the existing marketing database. After reviewing an Audi Q7 marketing plan stored in the marketing database, the filter search determines based on the subdivision stored in the marketing database that the marketing plan is subdivided in the database as follows: The Audi Q7 Marketing Plan 671 is split into three geographical regions: Asia Audi Q7 672, Australia Audi Q7 673, and Europe Audi 674, which are each assigned to a subnode of the root node corresponding to the entire Audi Q7 Marketing Plan 671. The Europe Audi 674 subnode is further divided into an Italy Audi 675 and Germany Audi 676 subnodes, with the Germany Audi 676 subnode further divided into an Audi Q7 Product Launch 677 section subnode and an Audi Q7 Dealer Enhancement 678 section subnode. Had the search turned up no marketing plans, then in an embodiment the marketing plan tab 270 may be grayed out, removed from the screen, or otherwise differentiated to indicate the lack of selectable plans. In an embodiment, the filter search 200 may also further limit the marketing plans shown in the marketing plan tab 270 to those governing marketing activities within the time period(s) selected in the time tab 230, under the account(s) selected in the accounts tab 240, covering the product(s) selected in the products tab 250, and covered by the agreement(s) selected in the agreements tab 260. In FIG. 6 the visual "check mark" indicators in time tab 230, accounts tab 240, products tab 250, and agreements tab 260 may be used in an embodiment to indicate additional limiting criteria applied to the result set shown in the marketing plan tab 270, remind the user that the user had selected particular narrowing or filtering criteria in the prior tabs in which the visual indicators appear, or both depending on how the additional search criteria are configured in an embodiment. Furthermore, in an embodiment, each of the tabs 230 to 270 may be moved to a higher or lower position among the other tabs to change the order in which additional limiting criteria are applied in those embodiments where the additional search criteria are used as additional limiting criteria for the remaining tabs.

Figure 7:
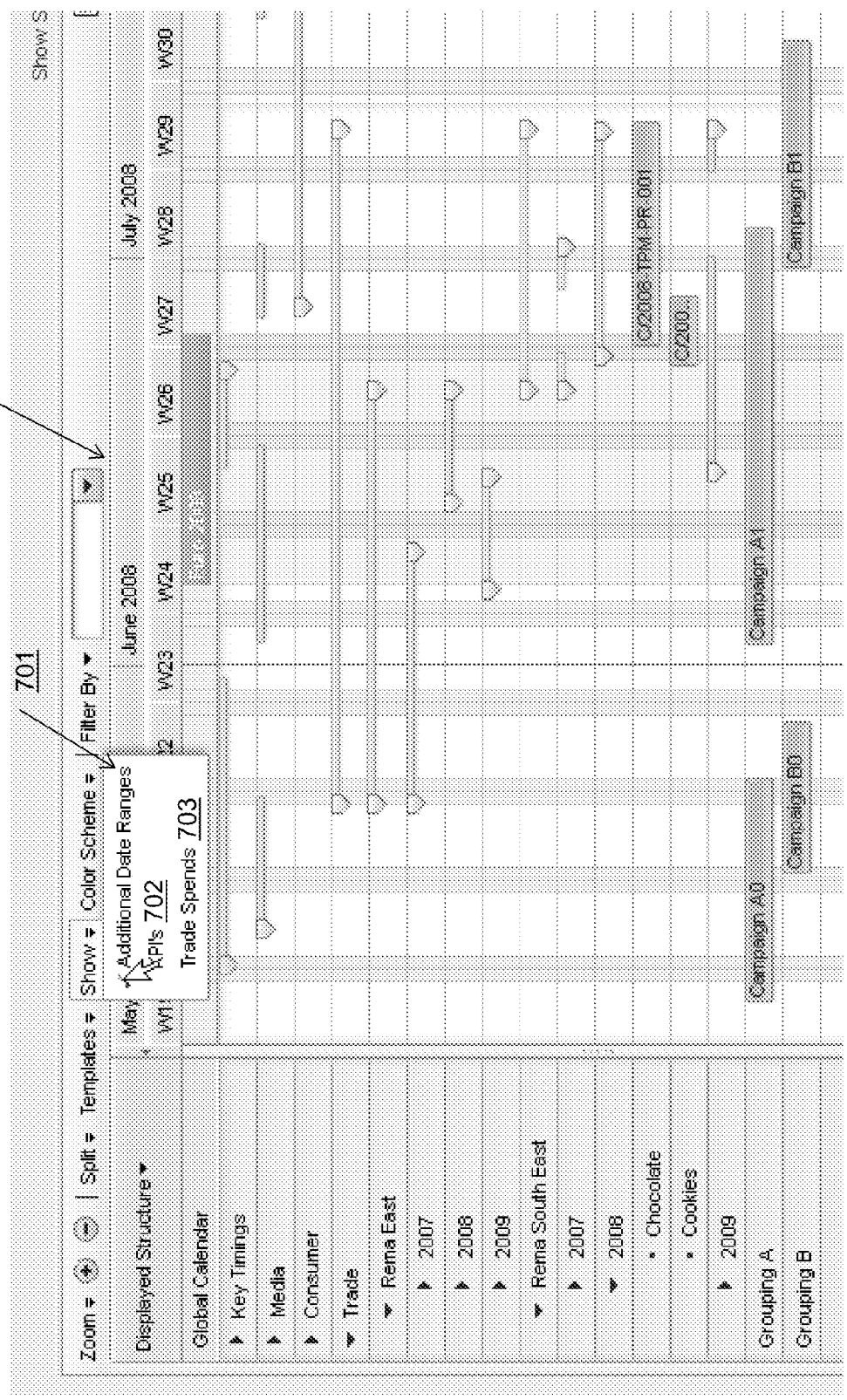
FIG. 7 shows an exemplary Gantt chart generated from the filter search results in an embodiment.

Once a user has selected the desired nodes in the cluster area 210 and one or more tabs 230 to 270 by which to filter or narrow any results, the user may activate the search 381 and return the results based on the selected nodes. In an embodiment, the results may be presented in the form of a Gantt chart that may appear below the cluster area 210 and the additional search criteria area 220. The data and timescales presented in the Gantt chart may be limited according to the nodes in each of the tabs 230 to 270 and cluster area 210 selected by the user. Thus, for example, if the user selects only marketing projects occurring between January 2008 and December 2008 in the time tab 230, then the Gantt chart may only display the selected time between January 2008 and December 2008. Data displayed in the Gantt chart may be further restricted or limited depending on the other search criteria and nodes selected by the user. An exemplary Gantt chart 700 generated from the filter search 200 results in an embodiment is shown in FIG. 7. As an alternative to the Gantt chart, the user may also display search results in a list format or other format configured by the user.

In an embodiment, the user may continue to adjust the search results by selecting or deselecting additional nodes in either the cluster area 210 or the tabs 230 to 270. The user may then opt to either erase and create a new Gantt chart underneath the cluster area 210 and additional search criteria area 220 by activating the search 681, or may choose to generate a second Gantt chart to be displayed underneath the first Gantt chart by activating the Search in Split Calendar 682. Activating the Search in Split Calendar 682 feature may allow a user to display multiple Gantt charts containing different data for data comparison purposes.

A user who has selected multiple additional search criteria in multiple tabs 230 to 270 may quickly review each of the nodes selected by the user without having to cycle through each of the tabs 230 to 270 by activating the filter summary 601. In an embodiment, the filter summary 601 cycles through each of the tabs 230 to 270 and extracts each of the nodes previously selected by the user. The extracted nodes in each of the tabs 230 to 270 selected by the user are then consolidated into a single area where the user can quickly review the search criteria and nodes selected by the user without having to switch tabs or views and without having to scroll or sift through unselected and/or irrelevant search criteria and nodes. In an embodiment, the filter summary 601 may also display the nodes in the cluster area 210 selected by the user.

As discussed previously, once the search 681 is executed by filtering or limiting search results to data relating to the selected nodes in the cluster area 210 and the additional search area 220, including nodes selected in tabs 230 to 270, the results may be displayed in a Gantt chart 700 or an itemized list either below the filter search tool 200, or in a separate window or display element. In order to ensure that the Gantt chart is displayed quickly and within a reasonable amount of time after executing the search 681, the data initially displayed in the Gantt chart may be limited in an embodiment to higher level data, such as start dates, duration, and status. Initially limiting the data displayed in the Gantt not only reduces processing times and ensure faster loading times for the Gantt chart, but it also may reduce clutter and improve overall readability of the Gantt chart.

However, in some embodiments a user may desire additional information to supplement the basic information initially displayed in the Gantt chart. In these instances, the user may activate a show feature to display one or more of the following additional information: additional date ranges 701, key performance indicators (KPIs) 702, and trade spends 703. In activating at least one of these three show features, one or more components of the application enabling the creation of the Gantt chart 700 may also be activated. In an embodiment, these components may be preconfigured to interact, search, retrieve, organize, and present data from existing computing systems and databases, such as the marketing system database.

Figure 8:
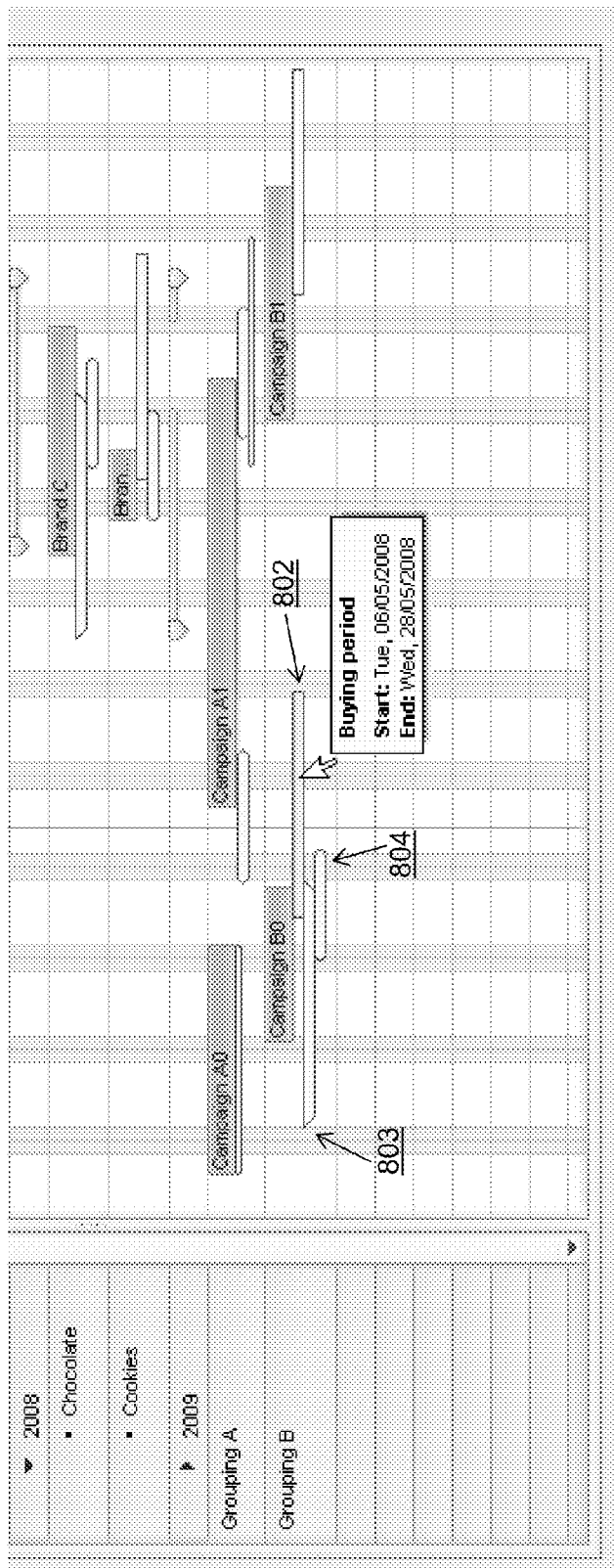
FIG. 8 shows an embodiment where the additional date ranges are selected for display in a Gantt chart.

FIG. 8 shows an embodiment where the additional date ranges 701 are selected for display in the Gantt chart 700. As discussed previously, the initial Gantt chart may be configured in an embodiment to display basic information about the start, duration, and status of a particular marketing activity, promotion, or campaign. This basic information may be shown in the timeline display entry for Campaign B0 as shown in both FIGS. 7 and 8. In an embodiment, when a user activates the additional date ranges 701 feature, the components associated with the feature may initiate a search of all data linked to or associated with a particular marketing activity, promotion, or campaign displayed in the Gantt chart 700. In many instances, marketing activities, promotions, or campaigns may have several events that occur outside the timeframe of the actual activity, promotion, or campaign. For example, while an advertisement campaign may only last for three weeks, there are often various preparatory and post-campaign events that occur before and after the advertisement campaign such as distribution of products and materials associated with the campaign before the campaign starts, and ongoing sales of advertised products after the campaign ends.

When searching data in the marketing database linked to the marketing projects displayed in the Gantt chart 700, data identifying the type of event and a start date and an end date of each event may be retrieved. Each event type may be assigned a distinct shape, color, or identifier in an embodiment. For example, the event type corresponding to a buying period may be a rectangle 802, so that the start, duration, and end of a buying period are shown as a rectangle 802 as indicated in FIG. 8. A buying period may represent the time that a particular product or promotion associated with a marketing project is available for purchase. Other event types, such as product distribution periods may be assigned different identifiers such as isosceles trapezoid 803 or hexagon 804.

In an embodiment the additional date ranges 701 added to the Gantt chart 700 may further vary depending on the role of the user. In an embodiment, components associated with the additional date ranges 701 feature may access user profile information stored in other computing systems of the organization. For example, user profile information identifying the role of user, such as marketing employee, accounting manager, or sales director may be retrieved from a system or user administration database. In an embodiment, a database or mapping table may be included among the components associated with the additional date ranges 701 to display the additional date ranges 701 and events associated with a user's role in the database or table. Thus, different users will be able to view different additional date ranges, each of which may also be differentiated differently, depending on the role of the user. Incorporating the user role when displaying additional date ranges 701 may eliminate clutter by only presenting information directly relevant to a particular user role.

Figure 9:
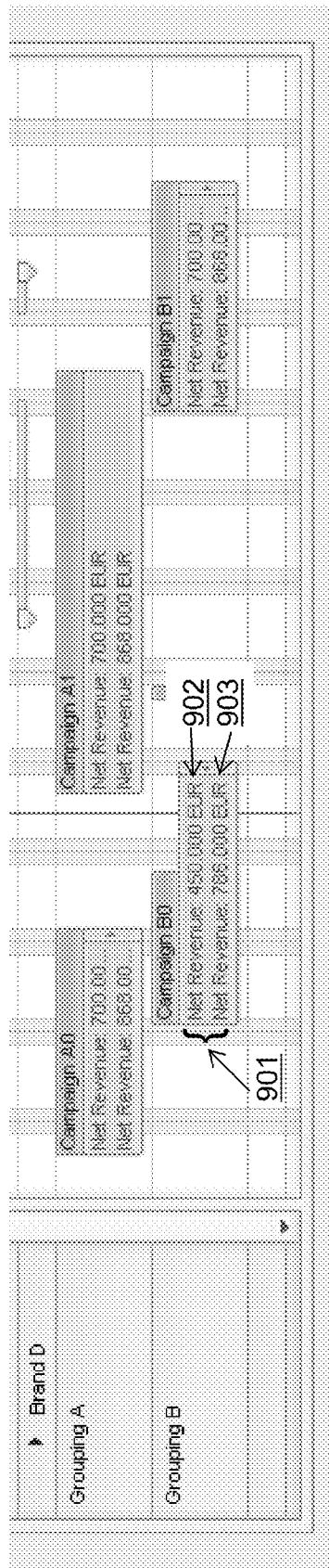
FIG. 9 shows an embodiment where the key performance indicators (KPIs) are selected for display in a Gantt chart.

FIG. 9 shows an embodiment where the key performance indicators (KPIs) 702 are selected for display in the Gantt chart 700. As discussed previously, the initial Gantt chart may be configured in an embodiment to display basic information about the start, duration, and status of a particular marketing activity, promotion, or campaign. This basic information may be shown in the timeline display entry for Campaign B0 as shown in both FIGS. 7 and 9. In an embodiment, when a user activates the KPIs 702 feature, the components associated with the feature may initiate a search of all data linked to or associated with a particular marketing activity, promotion, or campaign displayed in the Gantt chart 700. In many instances, KPIs are quantitative figures resulting from summarizing or combining existing data. Examples of KPIs include, but are not limited to, revenue, income, expenses, and number of products sold. When the KPIs 702 are selected for display, an expandable block 901 may be displayed underneath the corresponding marketing project timeline, such as that for Campaign B0. The actual KPIs that are displayed in the block 901, such as Net Revenue 902 and 903, may vary depending on the user role. Thus, it is possible that different users may see different KPIs. Thus, a user, such as a marketing manager may see the number of products sold when they select KPIs 702 for display in the block 901, while an accounting manager may see net income generated from the campaign when they select KPIs 702 for display.

In order to display customized KPI 702 information, in an embodiment, the components enabling the KPIs 702 may use the criteria entered into the filter search 200, including nodes selected in the cluster area 210 and in tabs 230 to 270, to limit the data considered when displaying KPIs in the block 901. In an embodiment, the components enabling the KPIs 702 may interface with both existing marketing, inventory, and/or financial system in the organization. The components may retrieve data from the existing marketing systems to identify marketing projects and relevant products and/or accounts within the marketing project during the time period specified by a user. Once the time period, marketing projects, products, and accounts have been identified from the marketing systems, the pertinent quantitative data relating to the products or accounts may be extracted from the inventory and/or financial systems. For example, the revenue generated either from a specific account or from the sale of identified products within the time period may be extracted and aggregated from the financial system. Similarly, a change in percentage of products sold within the time period may be calculated from data in the inventory system.

Depending on the role of the user and the configuration of the KPIs, multiple KPIs may be displayed in block 901. Thus, in one embodiment a marketing director could see KPIs in block 901 showing both a percentage of sales increases during the campaign and a cost of the campaign, whereas an inventory control manager may see the change in inventory levels for different products in a marketing campaign during the course of the campaign. This is another example of how clutter may be reduced by providing user role customized KPI data to different users in the organization in an embodiment.

Figure 10:
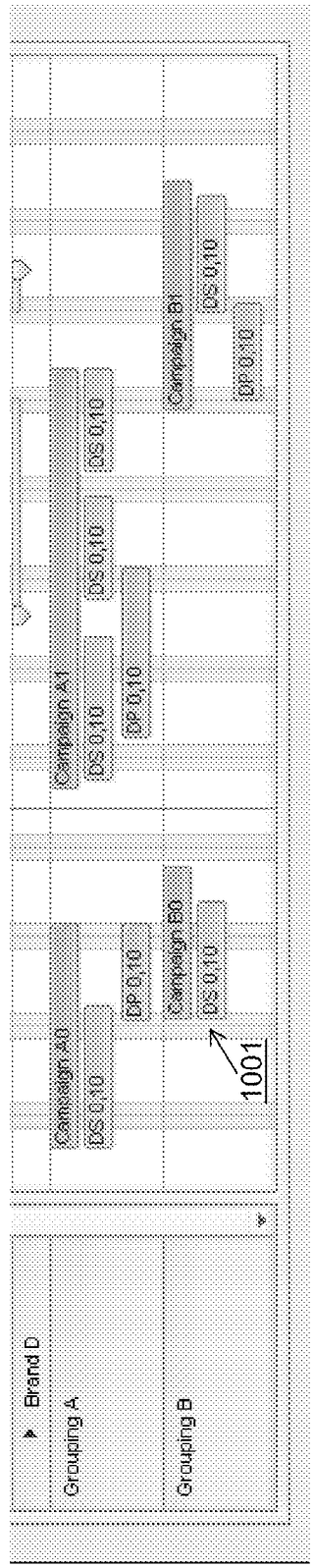
FIG. 10 shows an embodiment where the trade spends are selected for display in a Gantt chart.

FIG. 10 shows an embodiment where the trade spends 703 are selected for display in the Gantt chart 700. As discussed previously, the initial Gantt chart may be configured in an embodiment to display basic information about the start, duration, and status of a particular marketing activity, promotion, or campaign. This basic information may be shown in the timeline display entry for Campaign B0 as shown in both FIGS. 7 and 10. In an embodiment, when a user activates the trade spends 703 feature, the components associated with the feature may initiate a search of cost data associated with each marketing project displayed in the Gantt chart 700 to retrieve trade spending data. The cost and trade spending data may be stored in existing marketing system databases in an embodiment.

Trade spends are payments made to, or discounts given to retailers, such as supermarkets, by product suppliers. Trade spends include, but are not limited to, payments made for preferred shelf space, cooperative advertising, and in-store product promotions expenditures. In an embodiment, trade spending data may be derived from an agreement, such as those in the agreement tab 260. In an embodiment, an agreement may specify the start date, end date, and duration of a trade spend as well as agreed costs associated with the trade spend. For example, the agreement may specify a discount of ten cents for each block of products positioned on a preferred shelf space. In an embodiment, these agreement terms may be stored in distinct fields of the existing marketing system database and may be retrieved and directly displayed in a subordinate time scale 1001 underneath the market campaign B0 time scale. In an embodiment, the start and end dates of the time scale 1001 as well as the text "DS 0,10" inside the time scale 1001 may reflect the data extracted from the database.

In an embodiment the extracted data from the agreement in the existing marketing system database may be combined with other data extracted from other systems such as the financial system or inventory system. In this embodiment, data extracted from the agreement, such as data representing a product, an account, a start date, an end date, and a payment amount may be sent to another system, such as the inventory system, to, for example, retrieve the total quantity of products sold or provided to the account owner between the start date and end of the promotion. This total quantity may then be multiplied by payment amount per quantity to obtain a total payment or cost of the trade spend. This total payment or cost may then be included in the trade spend timescale 1001. In an embodiment multiple trade spends for each marketing campaign may also be displayed, as shown in FIG. 10 for campaigns A0, A1, and B1. The actual trade spend time scales that are displayed in the Gantt chart 700 may also vary depending on the user role. Thus, it is possible that different users may see different trade spends depending on the user role, just as different users may see different KPIs and additional date ranges.

In order to display customized trade spend 703 information, in an embodiment, the components enabling the trade spends 703 may use the criteria entered into the filter search 200, including nodes selected in the cluster area 210 and in tabs 230 to 270, to limit the data considered when displaying trade spends in the Gantt Chart 700. By limiting the trade spend information displayed through user role customizations and/or filter search node selections, clutter in the Gantt chart and processing resources needed to create the chart may be reduced in an embodiment.

Figure 11:
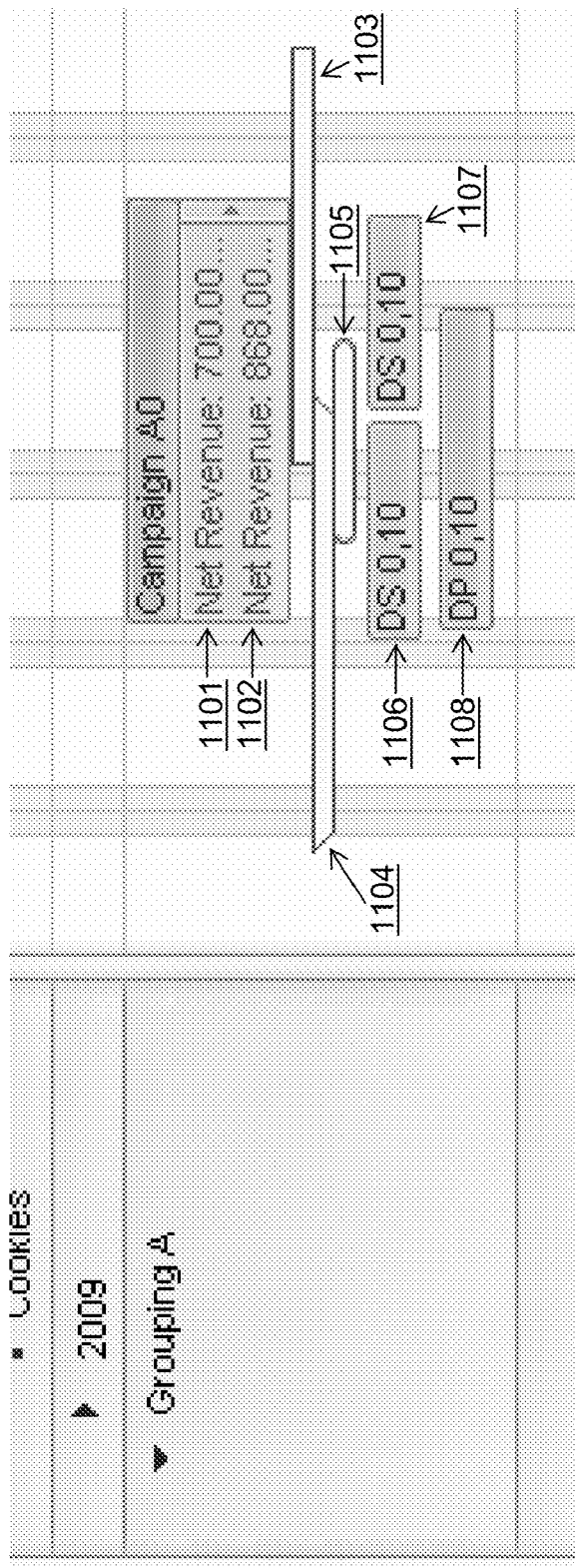
FIG. 11 shows an embodiment in which the time scale for a marketing campaign is shown in the Gantt chart together with the KPIs, additional date ranges, and trade spends for the marketing campaign.

FIG. 11 shows an embodiment in which the time scale for marketing campaign A0 is shown in the Gantt chart together with KPIs 1101 and 1102 corresponding to net revenue for two products 1101 and 1102 generated during the campaign A0; additional date ranges 1103, 1104, and 1105 distinguishing the start, end, and duration of different events related to campaign A0 using rectangular time scale 1103, isosceles trapezoid time scale 1104, and rounded time scale 1105; and trade spends 1106, 1107, and 1108 corresponding to different trade spends occurring during campaign A0. In an embodiment, selecting or deselecting any of the additional date ranges 701, KPIs 702, or trade spends 703 may cause the space assigned to a campaign in the Gantt chart to automatically readjust. This is evident when comparing the width of the row for campaign A0 in FIG. 7, when none of the additional date ranges 701, KPIs 702, or trade spends 703 were selected for display, to the width of the row for campaign A0 in FIG. 11 when all three of the additional date ranges 701, KPIs 702, and trade spends 703 were selected for display.

Figure 12:
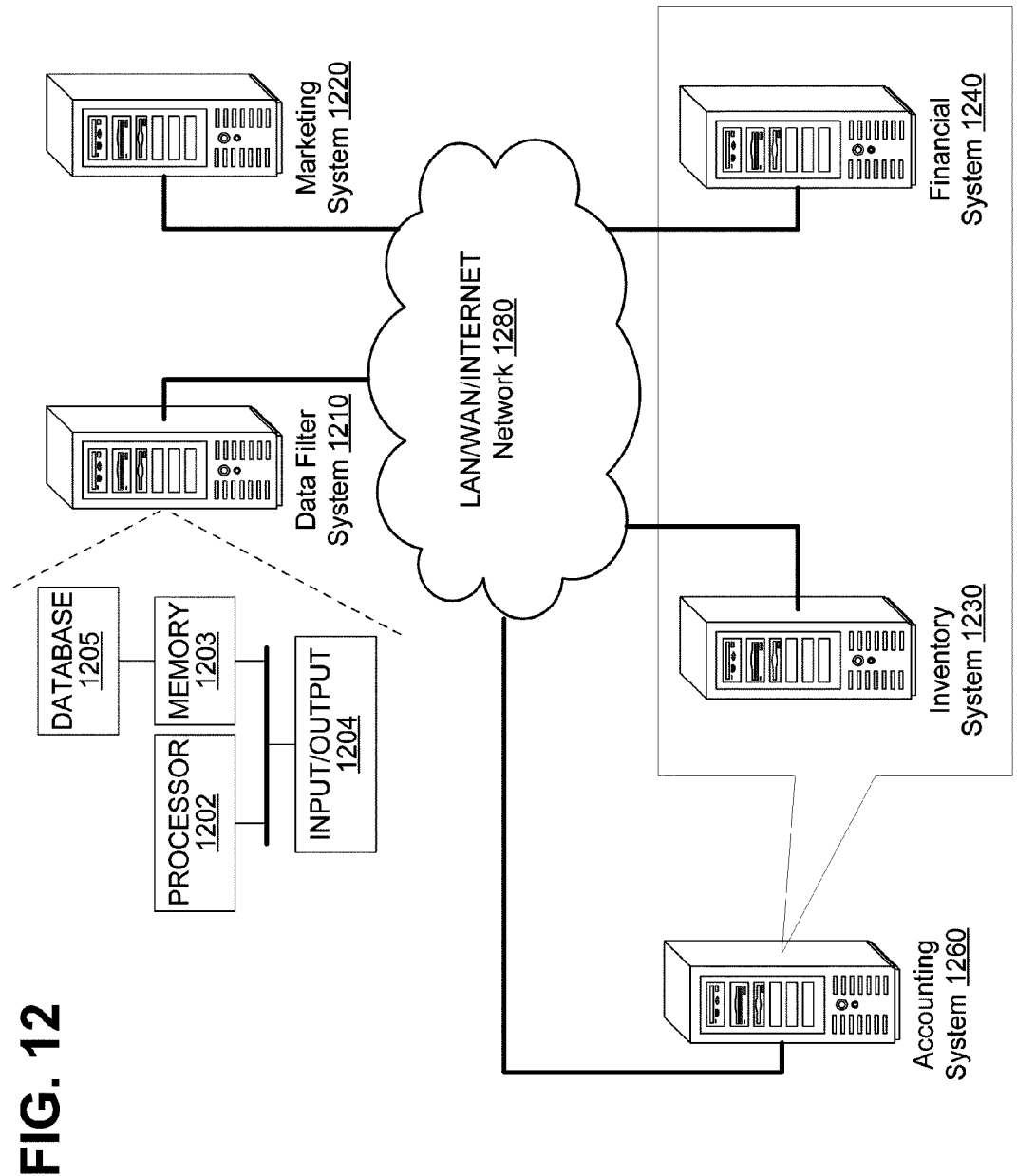
FIG. 12 shows an embodiment of a data filtering system containing the filter search tool and/or components activating and enabling the display of the additional date ranges, KPIs, and trade spends features in a Gantt chart.

FIG. 12 shows an embodiment of a data filtering system 1210 containing the filter search tool 200 and/or components activating and enabling the aforementioned show feature for displaying one or more of the additional date ranges 701, key performance indicators (KPIs) 702, and trade spends 703. In this embodiment, data filtering system 1210, marketing system 1220, inventory system 1230, and financial system 1240 are all interconnected through network 1280. In an embodiment, inventory system 1230 and/or financial system 1240 may be part of a larger accounting system 1260. Each of the systems in FIG. 7 may contain a processor 1202, memory 1203 containing a database 1205, and an input/output interface 1204, all of which are interconnected via a system bus. In various embodiments, each of the systems 1210, 1220, 1230, and 1240 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems 1210 to 1240, different embodiments may have different types, quantities, and configurations of systems depending on the environment and organizational demands. For example, in some embodiments the data filtering system may be consolidated or integrated into the marketing system 1220.

In an embodiment, memory 1203 may contain different components for retrieving, presenting, changing, and saving data. Memory 1203 may include a variety of memory devices, for example, Dynamic Random Access Memory (DRAM), Static RAM (SRAM), flash memory, cache memory, and other memory devices. Additionally, for example, memory 1203 and processor(s) 1202 may be distributed across several different computers that collectively comprise a system.

Processor 1202 may perform computation and control functions of a system and comprises a suitable central processing unit (CPU). Processor 1202 may comprise a single integrated circuit, such as a microprocessor, or may comprise any suitable number of integrated circuit devices and/or circuit boards working in cooperation to accomplish the functions of a processor. Processor 1202 may execute computer programs, such as object-oriented computer programs, within memory 1203.

Figure 13:
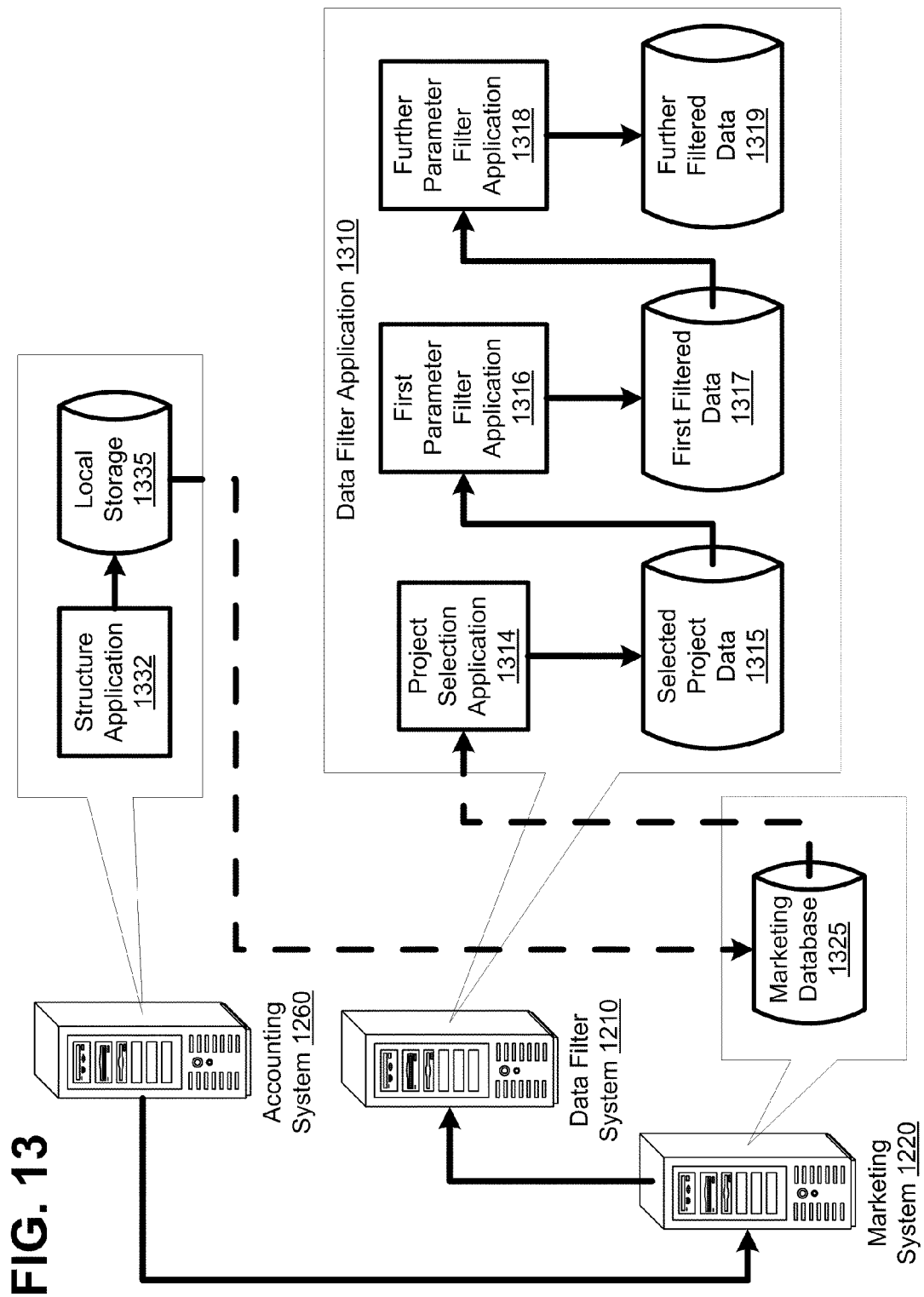
FIG. 13 shows exemplary interactions between the accounting, marketing, and data filter systems in an embodiment.

FIG. 13 shows the interaction between the accounting system 1260, marketing system 1220, and data filter system 1210 in an embodiment. In an embodiment, structural organizational information, such as a hierarchical principal-subsidiary structure of accounts 240, products 250, agreements 260, or marketing plans 270, may be stored 1335 in an itemized chart, table, or database by the accounting system 1260. In an embodiment, this structural information stored 1335 in the accounting system may be propagated, linked, or otherwise associated with corresponding entries in the marketing database 1325. In another embodiment, the structural information may be stored directly in the marketing database 1325, thereby bypassing the need for an interface with the accounting system 1260 for this information. In an embodiment, structural organizational information that is stored in the accounting system 1260 may be accessed, edited, imported, or otherwise modified through a structure application 1332. In some embodiments, the structural application 1332 may edit structure organizational information in the marketing database 1325.

In an embodiment, the data filter system 1210 may contain a data filter application 1310. The data filter application 1310 may contain many other applications, including a projection selection application 1314, a first parameter filter application 1316, and a plurality of further parameter filter applications 1318. In an embodiment, the project selection application 1314 may read marketing project data from the marketing database 1325 and present a selectable list of marketing projects in the database 1325. Once the user makes a selection of desired marketing projects, data from the desired marketing projects may be extracted from the marketing database 1325 and stored locally 1315 by the data filter system. The locally stored data 1315 may then be read to present the user with a selectable list of values of the desired first parameter from the locally stored data 1315. Once the user selects at least one parameter value, the locally stored data 1315 is filtered to extract only the previously selected marketing project data also having the selected filter parameter value. This first filtered data 1317 may also be stored locally in the data filter system 1210. Further filtering iterations can further narrow the scope of the data to be presented. Each additional filter application 1318 may present the user with a selectable list of parameter values corresponding to a desired parameter. Once the user selects the desired value(s), the previously filtered data may be further filtered 1319 to limit the data to that also having the desired parameter values. In an embodiment, this filtering process may be repeated until a desired filtered data set 1319 is obtained.

Figure 14:
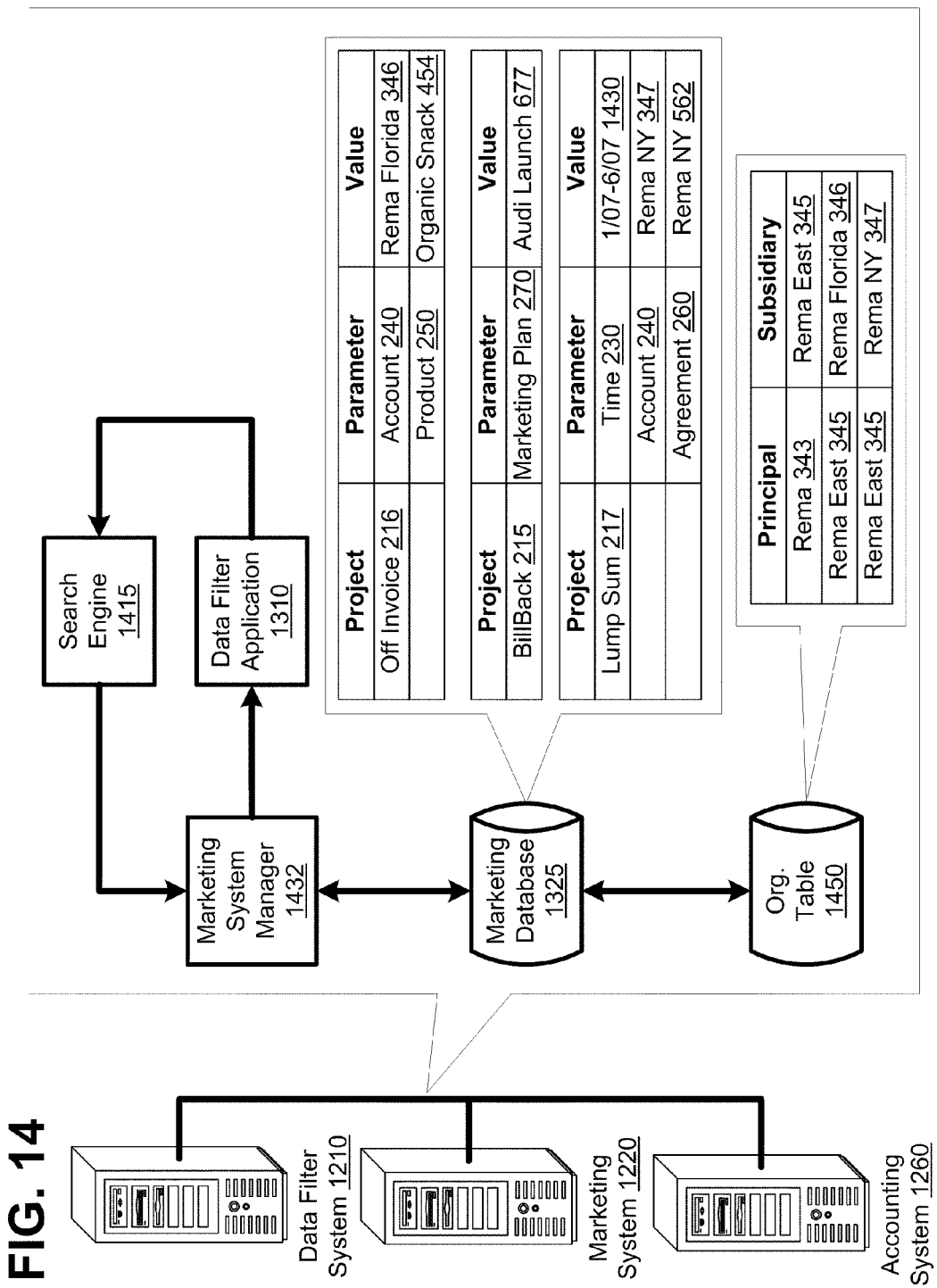
FIG. 14 shows the structure of data and interaction of processes between the data filter, marketing, and accounting systems in an embodiment.

FIG. 14 shows the structure of data and interaction of processes between the data filter system 1210, marketing system 1220, and accounting system 1260 in another embodiment. In an embodiment the marketing system manager application 1432 may manage interactions between these systems. In an embodiment, when a user wants to search the marketing project data in the marketing database 1325 by filtering, the marketing system manager 1432 may read marketing project data from the marketing database 1325. The read data may then be sent to the data filter application 1310, where it may be organized and presented to the user to select specific project data. Once the user selects the desired project data, the search engine 1415 may direct the marketing system manager 1432 to return only the desired data to the data filter application 1310 in order to narrow the data presented to the user. The user may then further refine the selection of the desired data as needed, with the process repeating itself until the final set of desired data is obtained.

In an embodiment, data in the marketing database 1325 relating to various marketing projects may be stored as itemized lists. For example, an off invoice marketing project promotion 216 may exist for organic snacks 454 sold to Rema Florida 346. The itemized list in the marketing database may store the off invoice project identifier 216 together with the account and marketing parameter identifiers 240 and 250, and the parameter values Rema Florida 346 and Organic Snack 454.

Another marketing project relating to a Bill Back promotion 215 may have the Audi Launch 677 marketing plan 270 associated with it. The itemized list for this promotion may contain the BillBack identifier 215 along with the marketing plan identifier 270 and the marketing plan value Audi Launch 677. The itemized list for a third lump sum promotion 217 may have the lump sum identifier 217 together with the time 230, account 240, and agreement 260 parameter identifiers and corresponding time values 1/07-6/07 1430, account value Rema NY 347, and agreement value Rema NY 562.

In an embodiment, structural information, such organizational chart data, contained in a organizational table 1450 may be linked to data in the marketing database 1325. The structural information may provide organization information about different times 230, accounts 240, products 250, agreements 260, and marketing plans 270 of a marketing project. For example, the organizational table 1450 may contain details of the relationship between different accounts, such as the Rema account 343 and the Rema NY account 347, wherein both Rema Florida 346 and Rema NY 347 are part of Rema East 345, which is part of Rema 343. In an embodiment, this organizational data in the organizational table 1450 may be used in conjunction with data stored in the marketing database 1325, to generate, for example, the hierarchical Rema account structure shown in FIG. 3.

Figure 15:
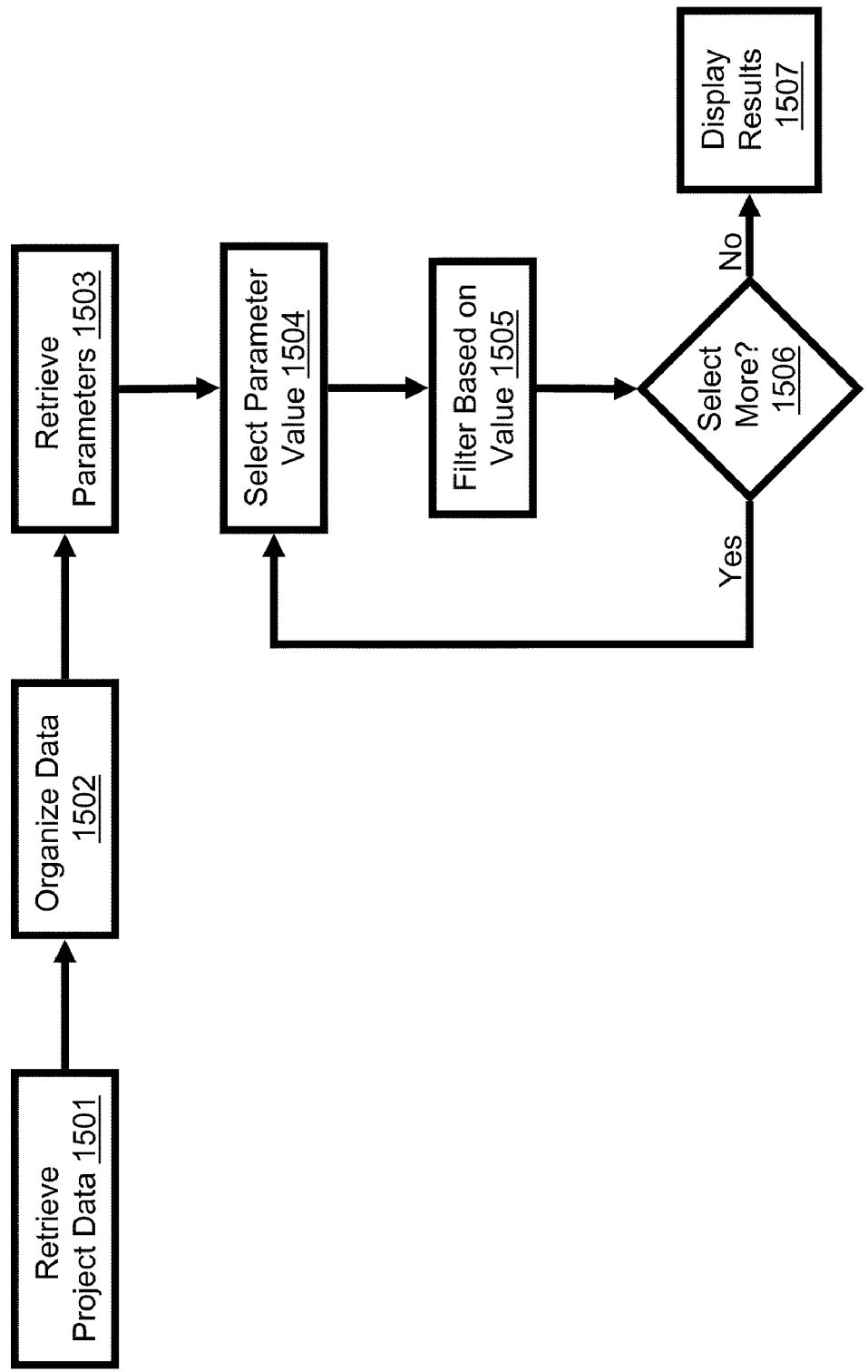
FIG. 15 shows an exemplary flow chart for filtering marketing project data in an embodiment.

FIG. 15 shows an exemplary flow chart for filtering marketing project data in an embodiment. In step 1501, project data, including marketing project identifiers, are read from a marketing database 1325 in marketing system 1220.

Once the marketing data has been read, the marketing project identifiers may be organized into a selectable list in step 1502. In an embodiment, the identifiers may be subdivided into one of three nodes: key timings 211, media 212, and trade 213, based on the mapping scheme previously mentioned.

After the data has been organized and a user has selected one or more desired marketing project identifiers, in step 1503, the parameters of the selected identifiers may be read from the marketing database 1325. Each of the parameters may be divided into a node hierarchy based on, for example, an organizational structure specified in an organizational table 1450.

In step 1504, the user may select one or more desired parameter values. After selecting a parameter or parameters, the marketing project data may be further filtered in step 1505 to include only the previously selected marketing project data satisfying the selected parameter values while excluding the rest of the data.

In step 1506, if the user opts to select more parameters, the process returns to step 1504 for the user to select additional parameter values, and the data is further filtered in step 1505 based on the parameter values selected in step 1504. If the user in step 1506 is done selecting parameter values, the final results may be displayed in step 1507.

In an embodiment the final results displayed in step 1507 may be limited to only marketing project data in the marketing database of selected marketing projects having selected parameter values. In an embodiment, the final results may be displayed in the form of a Gantt chart. In an embodiment, intermediate results may also be displayed in the Gantt chart. In an embodiment, the data displayed in the Gantt chart may be automatically updated as different marketing project identifiers and parameters are selected or deselected.

Figure 16:
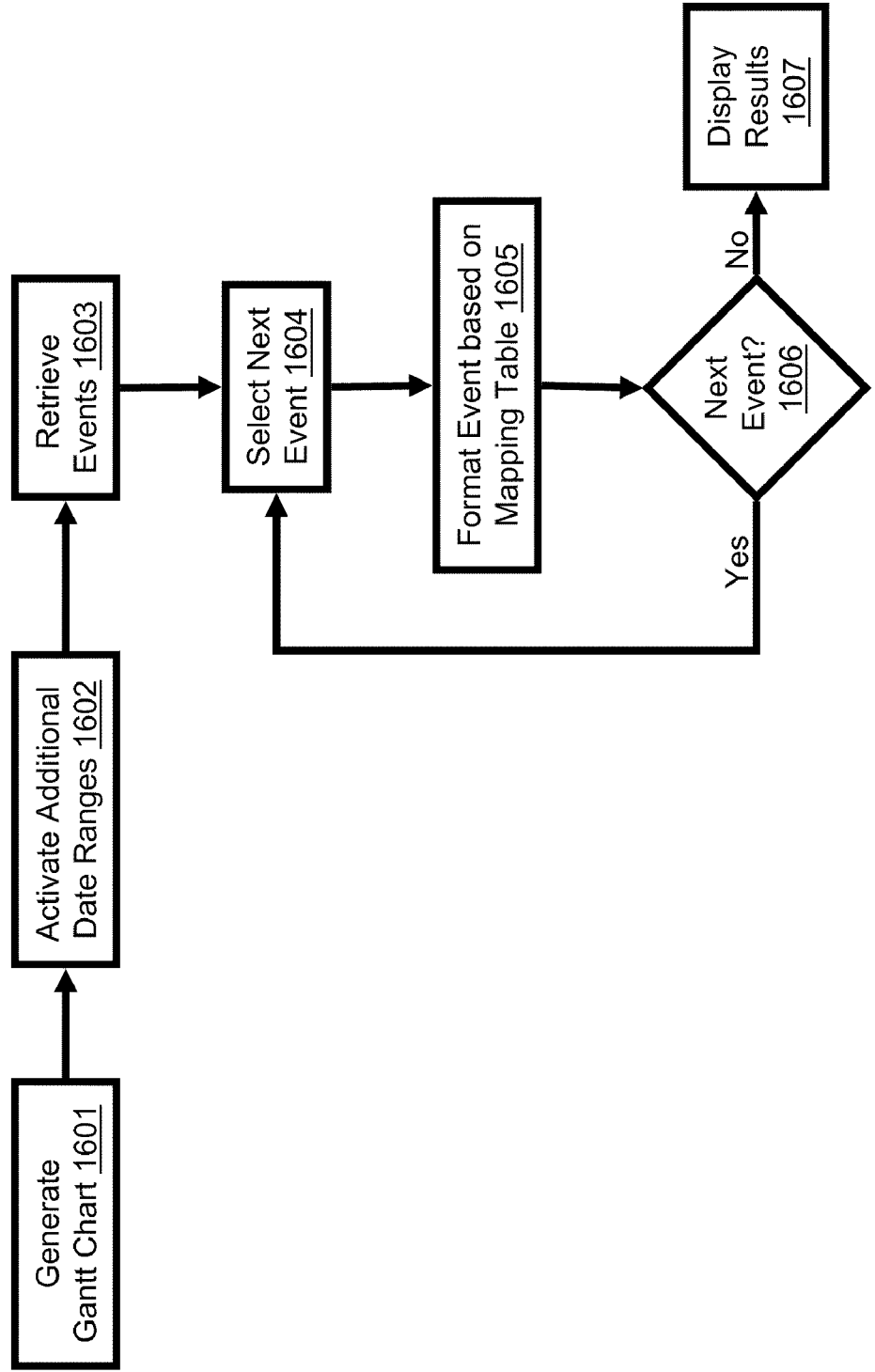
FIG. 16 shows an exemplary flow chart for activating additional date ranges in an embodiment.

FIG. 16 shows an exemplary flow chart for activating additional date ranges 701 in an embodiment. In step 1601, once a user has selected the desired nodes in the cluster area 210 and one or more tabs 230 to 270 by which to filter or narrow any results, the user may activate the search 381 and return the results based on the selected nodes, which may be presented in the form of a Gantt chart 700 that may appear below the cluster area 210 and the additional search criteria area 220. After the Gantt chart 700 in step 1601 is generated, a user may want to view additional date ranges 701 of events relating to marketing projects shown in the Gantt chart.

In step 1602, when a user activates the additional date ranges 701 feature, the components associated with the feature may initiate a search of all events linked to or associated with the marketing projects, including marketing activities, promotions, or campaigns, displayed in the Gantt chart 700.

In step 1603, data relating to these events, including a time, duration, and type of event, may be retrieved from the marketing database for each of the event associated with displayed marketing projects. Once the event data has been retrieved, each of the events may be individually analyzed to determine if the event data should be displayed.

In step 1604, a first event out of the retrieved events may be selected for further analysis.

In step 1605, the event type data for the selected event may be compared to a mapping table associating different event types with different identifiers. Each identifiers may specify different formatting instructions for the event type, such as, for example, shape, color, or size, to further distinguish each of the event types. Once the identifier associated with the event type is retrieved from the mapping table, the event type may be formatted according to the formatting instructions specified by the identifier.

In step 1606, a determination may be made as to whether there are still events that have to be further analyzed. If there are still events to be analyzed, the process returns to step 1604 to select another event to be analyzed. If there are no more events to be analyzed, the event data may be displayed in the Gantt chart in step 1607 according to the formatting instructions specified by the respective identifiers of each event type in the mapping table.

Figure 17:
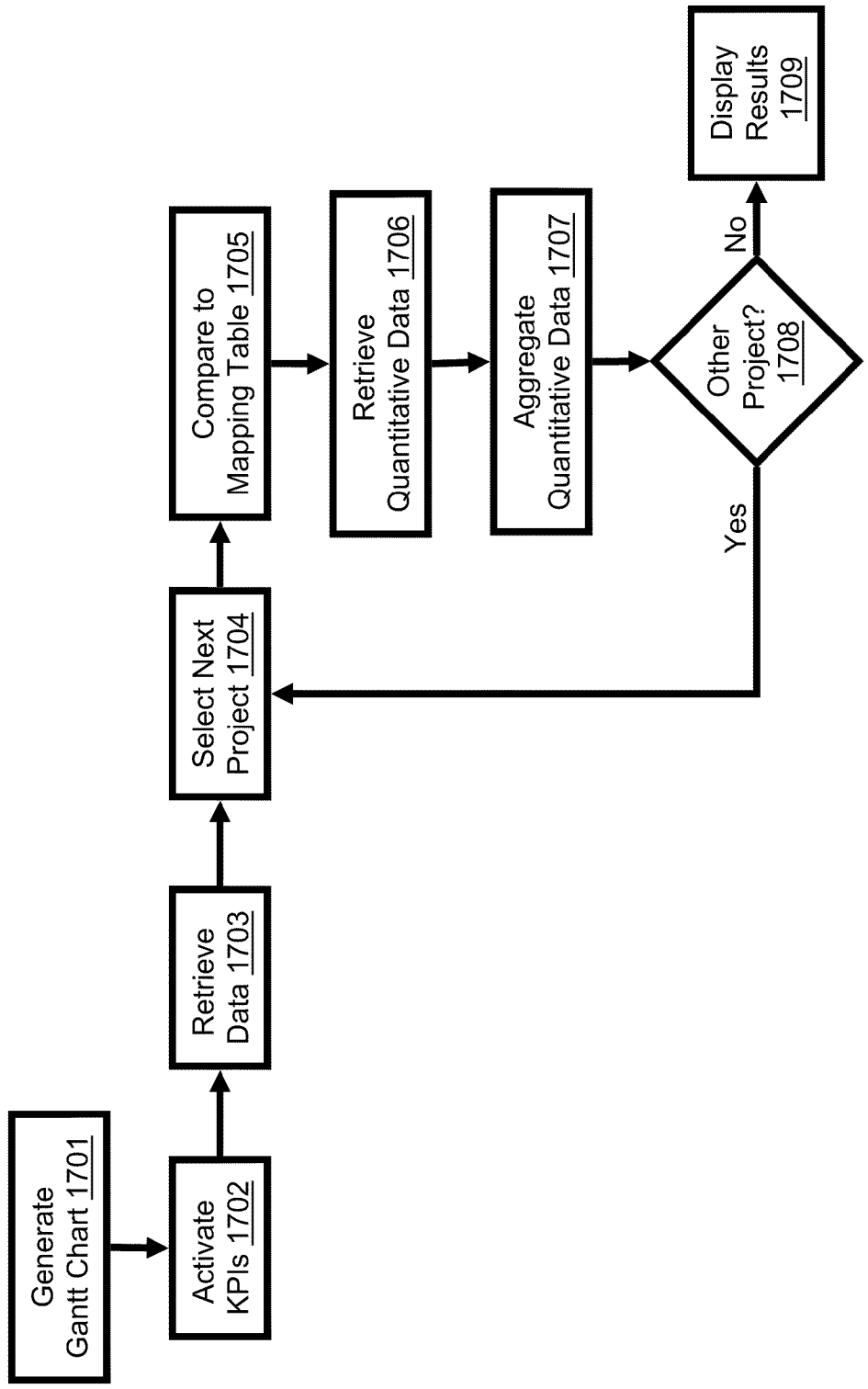
FIG. 17 shows an exemplary flow chart for activating KPIs in an embodiment.

FIG. 17 shows an exemplary flow chart for activating key performance indicators (KPIs) 702 in an embodiment. In step 1701, once a user has selected the desired nodes in the cluster area 210 and one or more tabs 230 to 270 by which to filter or narrow any results, the user may activate the search 381 and return the results based on the selected nodes, which may be presented in the form of a Gantt chart 700 that may appear below the cluster area 210 and the additional search criteria area 220. After the Gantt chart 700 in step 1701 is generated, a user may want to view additional KPIs 702 relating to marketing projects shown in the Gantt chart.

In step 1702, when a user activates the KPIs 702 feature, the components associated with the feature may initiate a search of products or accounts and time periods linked to or associated with the marketing projects displayed in the Gantt chart 700.

In step 1703, data identifying the products or accounts and time periods associated with the displayed marketing projects may be retrieved from the marketing database. Once the data has been retrieved, each of the marketing projects displayed in the Gantt chart 700 may be individually analyzed to determine what, if any, KPI data should be displayed.

In step 1704, a first marketing project displayed in the Gantt chart 700 may be selected for further analysis.

In step 1705, the selected marketing project may be compared to a mapping table associating different marketing projects with different KPIs. The mapping table may also contain instructions identifying the data needed to compute the KPI associated with each marketing project from other systems, such as inventory, financial, or accounting systems.

In step 1706, the specified data from these other systems may be retrieved using the previously identified products, accounts, and/or time periods retrieved from the marketing database in step 1703 as filters or further criteria on the data to be retrieved. For example, if the data needed to compute the KPI for total quantity of products sold is in a particular data field of an inventory system database, the products and time periods retrieved from the marketing database may be included in a subsequent query of that data field in the inventory system database. In step 1707, once the relevant KPI data has been retrieved, the data may be aggregated and displayed in summary form.

In step 1708, a determination may be made as to whether there are still marketing projects that have to be further analyzed. If there are still projects to be analyzed, the process returns to step 1704 to select another project to be analyzed. If there are no more projects to be analyzed, the KPI data may be displayed in aggregate form for each marketing project in the Gantt chart in step 1709.

Figure 18:
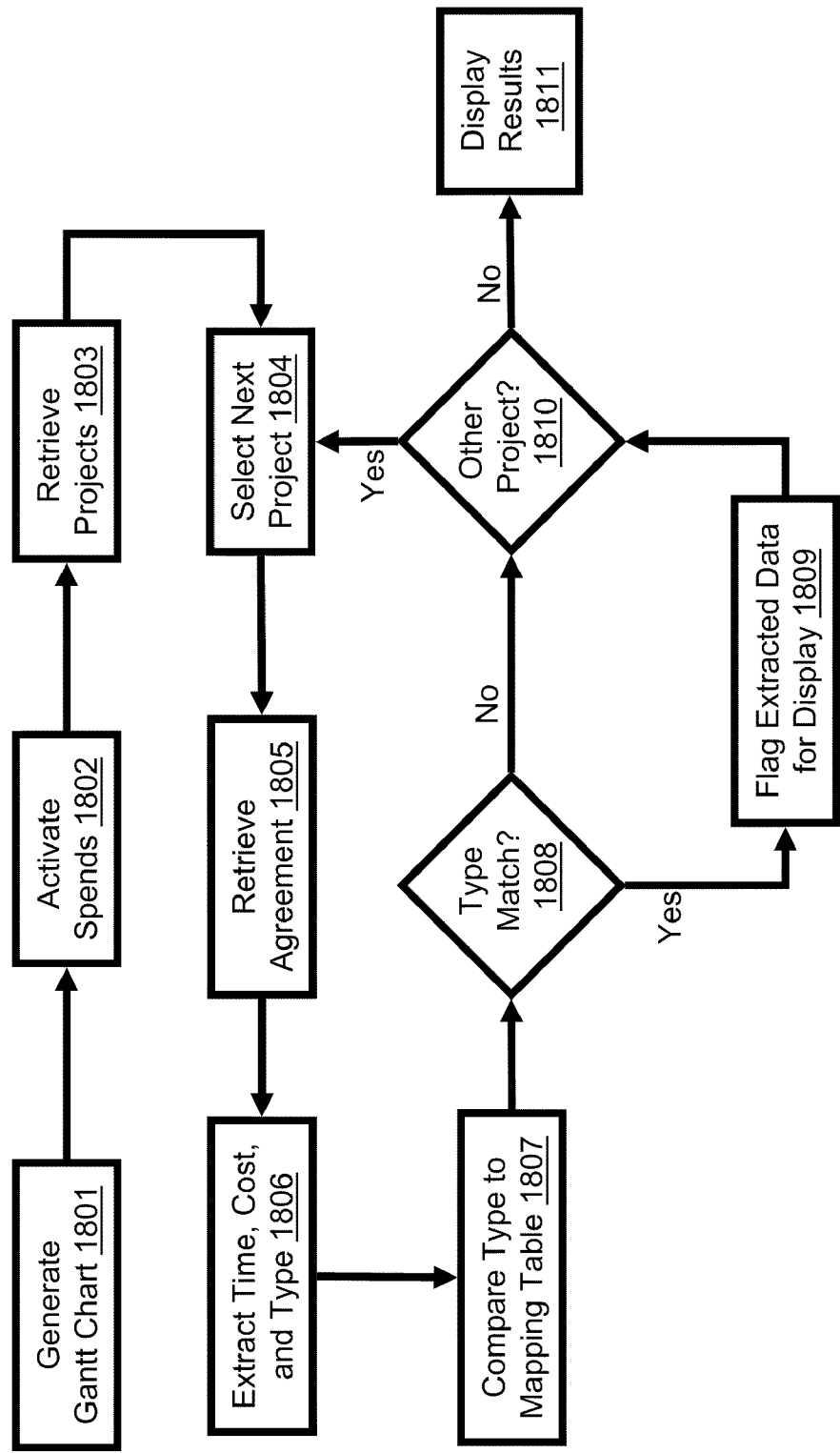
FIG. 18 shows an exemplary flow chart for activating trade spends in an embodiment.

FIG. 18 shows an exemplary flow chart for activating trade spends 703 in an embodiment. In step 1801, once a user has selected the desired nodes in the cluster area 210 and one or more tabs 230 to 270 by which to filter or narrow any results, the user may activate the search 381 and return the results based on the selected nodes, which may be presented in the form of a Gantt chart 700 that may appear below the cluster area 210 and the additional search criteria area 220. After the Gantt chart 700 in step 1801 is generated, a user may want to view additional trade spends 703 relating to marketing projects shown in the Gantt chart.

In step 1802, when a user activates the trade spends 703 feature, the components associated with the feature may initiate a search of the marketing projects displayed in the Gantt chart 700.

In step 1803, data identifying the displayed marketing projects may be retrieved from the marketing database. Once the data has been retrieved, each of the marketing projects displayed in the Gantt chart 700 may be individually analyzed to determine what, if any, trade spend 703 data should be displayed.

In step 1804, a first marketing project displayed in the Gantt chart 700 may be selected for further analysis.

In step 1805, an agreement linked to or associated with the selected marketing project may be retrieved from the marketing database.

In step 1806, a trade spend time, a trade spend cost, and a trade spend type may be extracted from the agreement retrieved in step 1805.

In step 1807, the extracted trade spend type of the selected marketing project may be compared to a mapping table listing specific trade spend types of different marketing projects to be displayed in the Gantt chart.

In step 1808, a determination may be made as to whether the extracted trade spend type of the selected marketing project corresponds to or matches an entry in the mapping table. If the extracted trade spend type matches, then in step 1809, the extracted trade spend type, cost, and time data are flagged for display to the user. Otherwise, the data is not flagged and not subsequently displayed to the user.

Next, in step 1810, a determination may be made as to whether there are still marketing projects that have to be further analyzed. If there are still projects to be analyzed, the process returns to step 1804 to select another project to be analyzed. If there are no more events to be analyzed, the KPI data may be displayed the flagged trade spend data for each marketing project in the Gantt chart in step 1811.

Note that while embodiments of the present invention are described in the context of a fully functional computer system, those skilled in the art will appreciate that modules of the present invention are capable of being distributed in a variety of forms across a plurality of systems. Embodiments consistent with the invention may also include one or more programs or program modules on different computing systems running separately and independently of each other, while in their entirety being capable of performing business transactions in a large enterprise environment or in a "software on demand" environment. These programs or program modules may be contained on signal bearing media that may include: recordable type media such as floppy disks and CD ROMS, and transmission type media such as digital and analog communication links, including wireless communication links.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM.

We claim:

1. A computer-implemented method comprising:
   reading, by a processor from a marketing system database, identifiers of marketing projects, each identifier identifying a marketing activity, promotion, or campaign in the marketing database;
   mapping to a trade node the identifiers of those marketing projects in the marketing database having a field with a remuneration entry to a trade partner or customer;
   mapping to a media node the identifiers of those marketing projects in the marketing database having a field with a known media entity name;
   mapping to a key timing node any remaining identifiers that do not map to either the trade node or the media node;
   presenting, in a cluster area of a filter search tool, a selectable list of the identifiers organized in a tree structure by their respective trade, media, and key timing nodes;
   receiving a selection of at least one marketing project identifier;
   updating, in respective tabs of an additional search area of the filter search tool, at least one list of: (a) time periods, (b) accounts, (c) products, (d) agreements, and (e) marketing plans, to show only those associated with the received marketing project identifier selection;
   receiving a selection of at least one of the updated time periods, accounts, products, agreements, and marketing plans; and
   compiling data, through the processor, from the marketing system database satisfying both the received marketing project identifier selection and the received updated time periods, accounts, products, agreements, and marketing plans selection.

2. The computer-implemented method of claim 1, where the additional search area includes a separate tab for selecting additional search criteria associated with each of: a time period, an account, a product, an agreement, and a marketing plan of each selected marketing project identifier.

3. The computer-implemented method of claim 1, where the marketing project identifiers are mapped to subordinate nodes in a node hierarchy by comparing fields in the marketing database linked to the marketing project identifiers to values associated with superior nodes in the node hierarchy.

4. The computer-implemented method of claim 1, where the list of time periods includes time period identifiers that are restructured into a node hierarchy with subordinate nodes encompassing a subset of time of superior nodes and each lowest subordinate node encompasses a time associated with at least one corresponding time period identifier.

5. The computer-implemented method of claim 4, further comprising a time scale adjuster, the time scale adjuster enabling a user to refine a time range displayed in the superior and subordinate nodes of the node hierarchy.

6. The computer-implemented method of claim 1, where an account structure is retrieved from an account database for each account in the list of accounts and the list of accounts is restructured into a node hierarchy based on the account structure.

7. The computer-implemented method of claim 1, where product classifications are retrieved from a product catalog database for each product in the list of products and the list of products is restructured into a node hierarchy based on the product classifications with subordinate nodes encompassing narrower product categories of superior nodes and each lowest subordinate node encompasses a product associated with at least one corresponding product identifier.

8. The computer-implemented method of claim 1, where an agreement date is retrieved from the marketing database for each agreement in the list of agreements and the list of agreements is restructured into a node hierarchy based on the agreement date with superior nodes encompassing broad agreement date time periods and each lowest subordinate node encompassing an agreement identifier of an agreement having an agreement date within the broad time period of its superior node.

9. The computer-implemented method of claim 1, where a predefined hierarchical structure for each marketing plan is retrieved from the marketing database for each marking plan in the list of marketing plans and the list of marketing plans is is restructured into a node hierarchy using the predefined hierarchical structure.

10. The computer-implemented method of claim 1, further comprising, responsive to an initial selection of at least one of the updated time periods, accounts, products, agreements, and marketing plans in one of the tabs of the additional search area, further limiting a subsequent selection in any remaining tabs to only those selections associated with the initial selection.

11. The computer-implemented method of claim 1, where the compiled data is displayed in a Gantt chart below the presented selectable lists.

12. The computer-implemented method of claim 11, where responsive to further selections of at least one marketing project identifier or corresponding identifier, further compiled data is displayed in a second Gantt chart below the previously displayed Gantt chart.

13. An article of manufacture comprising a computer-readable medium storing instructions that, when executed by a processor, cause the processor to:
- connect to a marketing system database, the marketing system database including identifiers of marketing projects;
- map to a trade node the identifiers of those marketing projects in the marketing database having a field with a remuneration entry to a trade partner or customer;
- map to a media node the identifiers of those marketing projects in the marketing database having a field with a known media entity name;
- map to a key timing node any remaining identifiers that do not map to either the trade node or the media node;
- present, in a cluster area of a filter search tool, a selectable list of the identifiers organized in a tree structure by their respective trade, media, and key timing nodes;
- receive a selection of at least one marketing project identifier;
- update, in respective tabs of an additional search area of the filter search tool, at least one list of: (a) time periods, (b) accounts, (c) products, (d) agreements, and (e) marketing plans, to show only those associated with the received marketing project identifier selection;
- receiving a selection of at least one of the updated time periods, accounts, products, agreements, and marketing plans; and
- compile data from the marketing system database satisfying both the received marketing project identifier selection and the received updated time periods, accounts, products, agreements, and marketing plans selection.

* * * * *